United States Patent
Lancioni et al.

(10) Patent No.: US 12,443,712 B2
(45) Date of Patent: Oct. 14, 2025

(54) METHODS AND APPARATUS TO CLASSIFY SAMPLES AS CLEAN OR MALICIOUS USING LOW LEVEL MARKOV TRANSITION MATRICES

(71) Applicant: McAfee, LLC, San Jose, CA (US)

(72) Inventors: German Lancioni, San Jose, CA (US); Carl Woodward, Santa Clara, CA (US); Jonathan Edwards, Portland, OR (US)

(73) Assignee: McAfee, LLC, San Jose, CA (US)

( * ) Notice: Subject to any disclaimer, the term of this patent is extended or adjusted under 35 U.S.C. 154(b) by 415 days.

(21) Appl. No.: 17/645,921

(22) Filed: Dec. 23, 2021

(65) Prior Publication Data

US 2023/0032194 A1 Feb. 2, 2023

Related U.S. Application Data

(60) Provisional application No. 63/227,305, filed on Jul. 29, 2021.

(51) Int. Cl.
 *G06F 21/56* (2013.01)
 *G06N 7/01* (2023.01)

(52) U.S. Cl.
 CPC ............ *G06F 21/566* (2013.01); *G06F 21/56* (2013.01); *G06F 21/567* (2013.01); *G06N 7/01* (2023.01); *G06F 2221/033* (2013.01)

(58) Field of Classification Search
 CPC .................................................. G06F 21/566
 See application file for complete search history.

(56) References Cited

U.S. PATENT DOCUMENTS 8,621,626 B2  12/2013  Alme
10,924,503 B1  2/2021  Pereira et al.
(Continued)

FOREIGN PATENT DOCUMENTS

CN   110991538 A   4/2020

OTHER PUBLICATIONS

D'Elia, D.C., Coppa, E., Palmaro, F. and Cavallaro, L., 2020. On the dissection of evasive malware. IEEE Transactions on Information Forensics and Security, 15, pp. 2750-2765. (Year: 2020).*
(Continued)

Primary Examiner — Luu T Pham
Assistant Examiner — Edward X Long
(74) Attorney, Agent, or Firm — Hanley, Flight & Zimmerman, LLC

(57) ABSTRACT

Methods, apparatus, systems, and articles of manufacture are disclosed to classify a sample as clean or malicious. An example apparatus includes instruction identifies circuitry to convert a sample into a sequence of instructions, abstract language circuitry to transform the sequence of instructions into an abstract language representation, transition matrix circuitry to create a Markov transition matrix, the Markov transition matrix to represent transitions within the abstract language representation, and classifier circuitry to classify an unknown sample as clean or malicious, the classification in response to whether the Markov transition matrix is closer to a clean group of Markov transition matrices or a malicious group of Markov transition matrices.

20 Claims, 12 Drawing Sheets

(56) References Cited

U.S. PATENT DOCUMENTS

| | | | |
|---|---|---|---|
| 2013/0326625 A1* | 12/2013 | Anderson | G06F 21/566 726/23 |
| 2016/0098561 A1 | 4/2016 | Keller et al. | |
| 2016/0132521 A1 | 5/2016 | Reininger et al. | |
| 2017/0126736 A1* | 5/2017 | Urias | H04L 63/1491 |
| 2019/0026466 A1* | 1/2019 | Krasser | G06N 7/01 |
| 2019/0199736 A1 | 6/2019 | Howard et al. | |
| 2023/0029679 A1 | 2/2023 | Lancioni et al. | |
| 2023/0030136 A1 | 2/2023 | Lancioni et al. | |
| 2023/0171277 A1* | 6/2023 | Giaconi | H04L 63/1408 726/23 |

OTHER PUBLICATIONS

Alaeiyan, M., Dehghantanha, A., Dargahi, T., Conti, M. and Parsa, S., 2020. A multilabel fuzzy relevance clustering system for malware attack attribution in the edge layer of cyber-physical networks. ACM Transactions on Cyber-Physical Systems, 4(3), pp. 1-22. (Year: 2020).*

United States Patent and Trademark Office, "Non-Final Office Action," issued in connection with U.S. Appl. No. 17/566,760, dated Dec. 7, 2023, 11 pages.

United States Patent and Trademark Office, "Notice of Allowance and Fee(s) Due," issued in connection with U.S. Appl. No. 17/566,760, mailed on Jun. 11, 2024, 11 pages.

United States Patent and Trademark Office, "Non-Final Office Action," issued in connection with U.S. Appl. No. 17/561,475 dated Mar. 14, 2024, 11 pages.

United States Patent and Trademark Office, "Final Office Action," issued in connection with U.S. Appl. No. 17/566,760, dated Apr. 29, 2024, 11 pages.

United States Patent and Trademark Office, "Notice of Allowance and Fee(s) Due," issued in connection with U.S. Appl. No. 17/561,475, mailed on Aug. 30, 2024, 6 pages.

United States Patent and Trademark Office, "Corrected Notice of Allowability," issued in connection with U.S. Appl. No. 17/561,475, mailed on Sep. 11, 2024, 3 pages.

* cited by examiner

ABSTRACT LANGUAGE REPRESENTATION 602

[START, 4, 1, 4, 4, 3, 4, 4, 1, 4, 1, 6, 1, 6, 1, 6, 1, 4, 4, 4, 1, 4, 4, 1, 6, 6, 6, 4, END]

DICTOGRAM 604

| ROW (X) \ COLUMN (Y) | START | 1 | 2 | 3 | 4 | 5 | 6 | END |
|---|---|---|---|---|---|---|---|---|
| START | 0 | 0 | 0 | 0 | 1 | 0 | 0 | 0 |
| 1 | 0 | 0 | 0 | 0 | 4 | 0 | 6 | 0 |
| 2 | 0 | 0 | 0 | 0 | 0 | 0 | 0 | 0 |
| 3 | 0 | 0 | 0 | 0 | 1 | 0 | 0 | 0 |
| 4 | 0 | 6 | 0 | 1 | 5 | 0 | 0 | 1 |
| 5 | 0 | 0 | 0 | 0 | 0 | 0 | 0 | 0 |
| 6 | 0 | 4 | 0 | 0 | 2 | 0 | 1 | 0 |
| END | 0 | 0 | 0 | 0 | 0 | 0 | 0 | 0 |

MARKOV TRANSITION MATRIX 606

| ROW (X) \ COLUMN (Y) | START | 1 | 2 | 3 | 4 | 5 | 6 | END |
|---|---|---|---|---|---|---|---|---|
| START | 0 | 0 | 0 | 0 | 1 | 0 | 0 | 0 |
| 1 | 0 | 0 | 0 | 0 | 0.4 | 0 | 0.6 | 0 |
| 2 | 0 | 0 | 0 | 0 | 0 | 0 | 0 | 0 |
| 3 | 0 | 0 | 0 | 0 | 1 | 0 | 0 | 0 |
| 4 | 0 | 0.46 | 0 | 0.08 | 0.38 | 0 | 0 | 0.08 |
| 5 | 0 | 0 | 0 | 0 | 0 | 0 | 0 | 0 |
| 6 | 0 | 0.57 | 0 | 0 | 0.29 | 0 | 0.14 | 0 |
| END | 0 | 0 | 0 | 0 | 0 | 0 | 0 | 0 |

FIG. 6

METHODS AND APPARATUS TO CLASSIFY SAMPLES AS CLEAN OR MALICIOUS USING LOW LEVEL MARKOV TRANSITION MATRICES

RELATED APPLICATION

This patent arises from a continuation of U.S. Patent Application Ser. No. 63/227,305, which was filed on Jul. 29, 2021. U.S. Provisional Patent Application No 63/227,305 is hereby incorporated herein by reference in its entirety. Priority to U.S. Provisional Patent Application No. 63/227,305 is hereby claimed.

FIELD OF THE DISCLOSURE

This disclosure relates generally to malware classification and, more particularly, to methods and apparatus to classify samples as clean or malicious using low level Markov transition matrices.

BACKGROUND

Malware is software that enables unauthorized access to networks for purposes of theft, sabotage, or espionage. In recent years, malware attacks have become increasingly diverse and complex. Computer security software companies are incentivized to produce malware identification software, which may be used by other businesses or general consumers to protect their systems and data.

BRIEF DESCRIPTION OF THE DRAWINGS

FIG. 6 is an example data set used to illustrate the transition matrix circuitry of FIGS. 2 and/or 3.

The figures are not to scale. In general, the same reference numbers will be used throughout the drawing(s) and accompanying written description to refer to the same or like parts.

Figure 1:
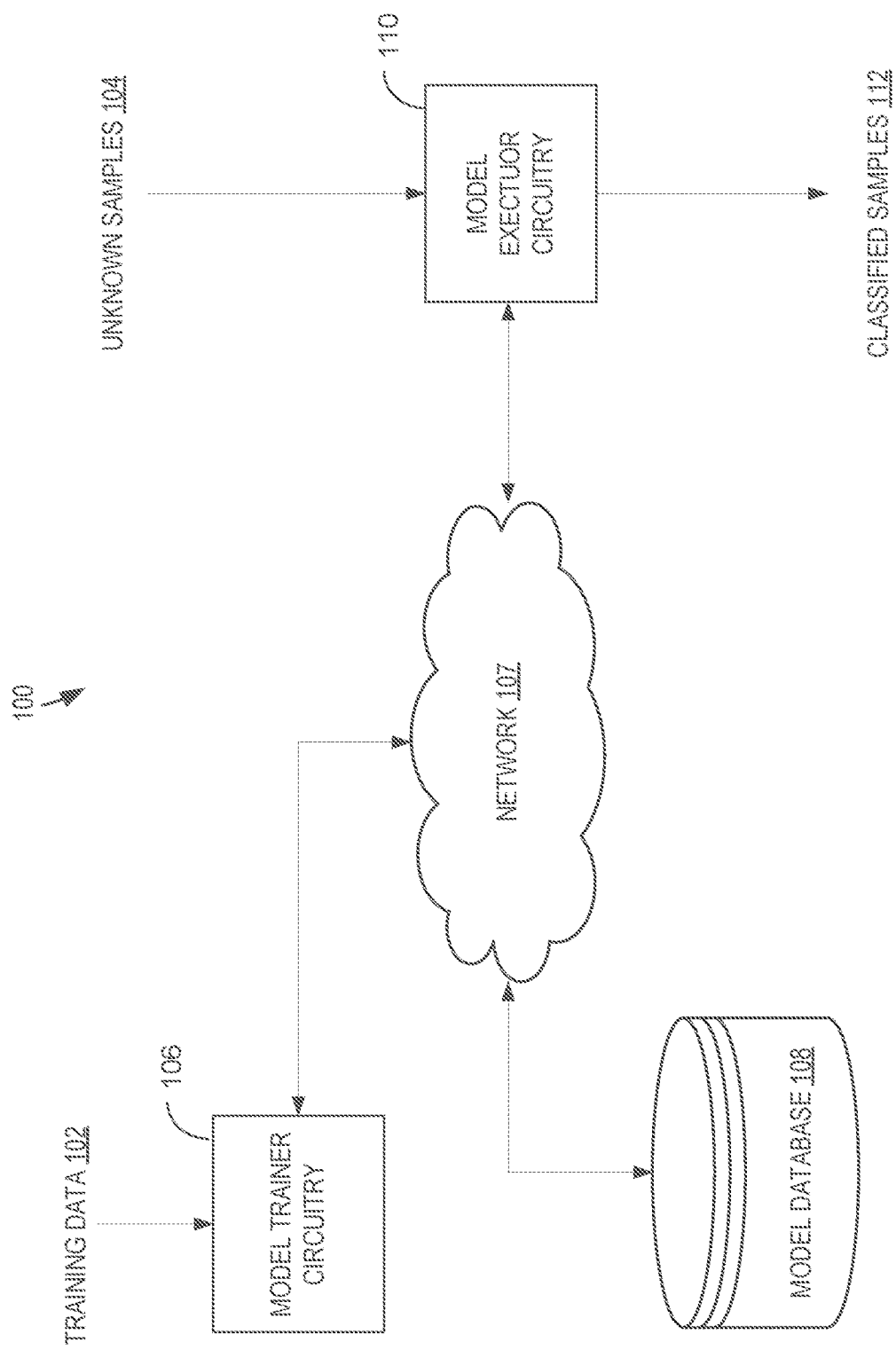
FIG. 1 is a block diagram of an example system to classify samples as clean or malicious.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors. Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Malware classification is a challenging technical task. Conventionally, previous approaches for malware classification such as static analysis and dynamic/behavior analysis operate by analyzing binary files, or by looking at execution events within an operating system. As a result, previous approaches may only find malware that exists within binary files, execution events within an operating system, or other software structures that operate within a similar context.

However, malware may exist in software structures such as disassembled code, which operate in a different context than described previously and generally are not analyzed in conventional malware classifiers.

Some previous approaches to classify malware have attempted to analyze disassembled code using feature engineering techniques. Feature engineering is a set of techniques that use knowledge about a specific field or specialized discipline to extract features from raw data. In some examples, knowledge about a specific field or specialized discipline may be referred to as domain knowledge. While approaches using disassembled code and feature engineering may classify malware under specific inputs, said approaches struggle to scale and maintain accurate results as the number and variety of inputs increase. An increased number and variety of inputs may be experienced by malware classification programs when the program is widely distributed for consumer use.

Example approaches disclosed herein to classify samples as clean or malicious include example model trainer circuitry 106 and example model executor circuitry 110. Within the example model trainer circuitry 106, example instruction identifier circuitry 202 to converts training data 102 into a sequence of instructions. Example abstract language circuitry 204 uses a clustering algorithm to transform the sequence of instructions into an abstract language representation. Example transition matrix circuitry 206 creates a Markov transition matrix based on the abstract language representation. Example group former circuitry 208 forms a transition matrix model by placing the Markov transition matrices into groups within a clean corpus and malicious corpus. When an unknown sample is provided, the example model executor circuitry 110 uses the same techniques described previously to determine a sequence of instructions, an abstract language representation, and a Markov transition matrix. The example model executor circuitry 110 additionally includes example classifier circuitry 306 to classify the unknown sample as clean or malicious based on how similar the Markov transition matrix of the unknown sample is to groups within the transition matrix model.

Example approaches disclosed herein classify samples as clean or malicious by analyzing disassembled code using Markov transition matrices. The use of Markov transition matrices are scalable and maintainable in a way that previous approaches using feature engineering techniques are not. As a result, example approaches disclosed herein classify malware that may not be previously identified in current malware classification programs, doing so in a matter that allows for integration into a widely distributed malware classification program.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a clustering algorithm is used. Using a clustering algorithm enables training data to be clustered into clean groups and malicious groups, which in turn enables a diverse set of unknown data to be classified as clean or malicious.

In general, machine learning models/architectures Shat are suitable to use in the example approaches disclosed herein use supervised training to create a model which then is used to identify unlabeled data. However, other types of machine learning models could additionally or alternatively be used such as using unsupervised training to create a model, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI clustering algorithms may be trained using k-means distribution, distribution clustering, or density clustering. However, any other training algorithm may additionally or alternatively be used. In examples disclosed herein, training is performed until the model reaches a target error rate or until the training data is exhausted. In examples disclosed herein, training is performed remotely, at a central facility. In some examples re-training may be performed. Such re-training may be performed in response to an increased error rate in the classification of unlabeled data. In some examples that employ ML/AI architectures or models other than clustering algorithms, training may be performed using hyperparameters that control how the learning is performed (e.g., a learning rate, a number of layers to be used in the machine learning model, etc.).

Training is performed using training data. In examples disclosed herein, the training data originates from an example computer security software company. Because supervised training is used, the training data is labeled. Labeling may applied to the training data by manually labeling known clean and malicious data, or through other malware classification programs that the example computer security company determines to be reliable. In some examples, the training data is pre-processed using, for example, disassembling portable executable files into a sequence of operations and operand. The pre-processing allows for the machine learning model to cluster operations and operands into abstract language states, to create Markov transition matrices based on a sequence of abstract language representations, and to classify samples as clean or malicious by determining how similar two Markov transition matrices are.

Once training is complete, the model is deployed for use as an executable construct that processes an input and provides an output based on the network of nodes and connections defined in the model. The model is stored at an example model database. The model may then be executed by example model executor circuitry.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a block diagram of an example system to classify samples as clean or malicious. The example system 100 includes example model trainer circuitry 106, a network 107, an example model database 108, and example model executor circuitry 110. The example system 100 accepts training data 102 and unknown samples 104 and uses them to produce classified samples 112.

The example model trainer circuitry 106 trains example transition matrix models using training data 102. As used herein, the term "training data" refers to samples that have been classified as clean or malicious. In the example system 100, a sample is portable executable (PE) file. A PE file is the native format of executable binaries (DLLs, drivers and programs) for the Microsoft Windows® operating systems. However, other operating systems may additionally or alternatively be used to execute PE files. PE file types may include but are not limited to: EXE, DLL, SYS, MSSTYLES, OCX, SCR and more. As used herein, the terms "sample" and "PE file" may be used interchangeably.

The example model trainer circuitry 106 may iteratively train transition matrix models until a model classifies training data with a desired accuracy. Example abstract language circuitry 204 may implement changes to the type and/or operating parameters of a clustering algorithm to implement a change between transition matrix models. The example abstract language circuitry 204 is explored further in FIG. 2. Further, the example model executor circuitry 110 may adjust one or more transition matrix models in response to an unknown sample exceeding a similarity threshold. In the example system 100, the model trainer circuitry is executed remotely, such as at a central facility operated by an example computer security software company.

The network 107 of FIG. 1 connects and facilitates communication between the example model trainer circuitry 106, the example model database 108, and the example model executor circuitry 110. In this example, the network 107 is the Internet. However, the example network 107 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example model database 108 stores the one or more transition matrix models. The transition matrix model is composed of a clean corpus and a malicious corpus, where each corpus is comprised of a plurality of groups. Each group within each corpus is composed of a plurality of samples, and each sample has an associated transition matrix. The composition of the example model database is explored further in FIGS. 2, 4, and 5.

The example model database 108 of the example system 100 is implemented by any memory, storage device and/or storage disc for storing data such as. for example, flash memory, magnetic media, optical media, solid state memory, hard drive(s), thumb drive(s), etc. Furthermore, the data stored in the example model database 108 may be in any data format such as, for example, binary data, comma delimited data, tab delimited data, structured query language (SQL) structures, etc. While in FIG. 1 the example model database 108 is illustrated as a single device, the example model database 108 and/or any other data storage devices described herein may be implemented by any number and/or type(s) of memories.

The example model executor circuitry 110 of FIG. 1 accepts unknown samples and uses the example model database 108 to produce classified samples 112. While the example system 100 provides these classified samples externally as a result, the model executor circuitry 110 may additionally provide a classified sample to the model database 108 via the network to adjust the transition matrix model.

The example model executor circuitry 110 may be implemented within a computer security software program developed by the example computer security software company. The model executor circuitry 110 and encompassing computer security software program may executed by any internet capable device, such as but not limited to laptops, desktops, smart phones, tablets, etc. While one model executor circuitry 110 is illustrated in FIG. 1 for simplicity, any number of devices may execute the model executor circuitry 110 within the example system 100. The example model executor circuitry 110 is explored further in FIG. 8.

The example system 100 trains, executes, and adjusts the transition matrix model stored in the example model database 108. In doing so, the example system 100 classifies unknown samples 104 using disassembled code, which may identify additional malware attacks that previous solutions could not identify.

Figure 2:
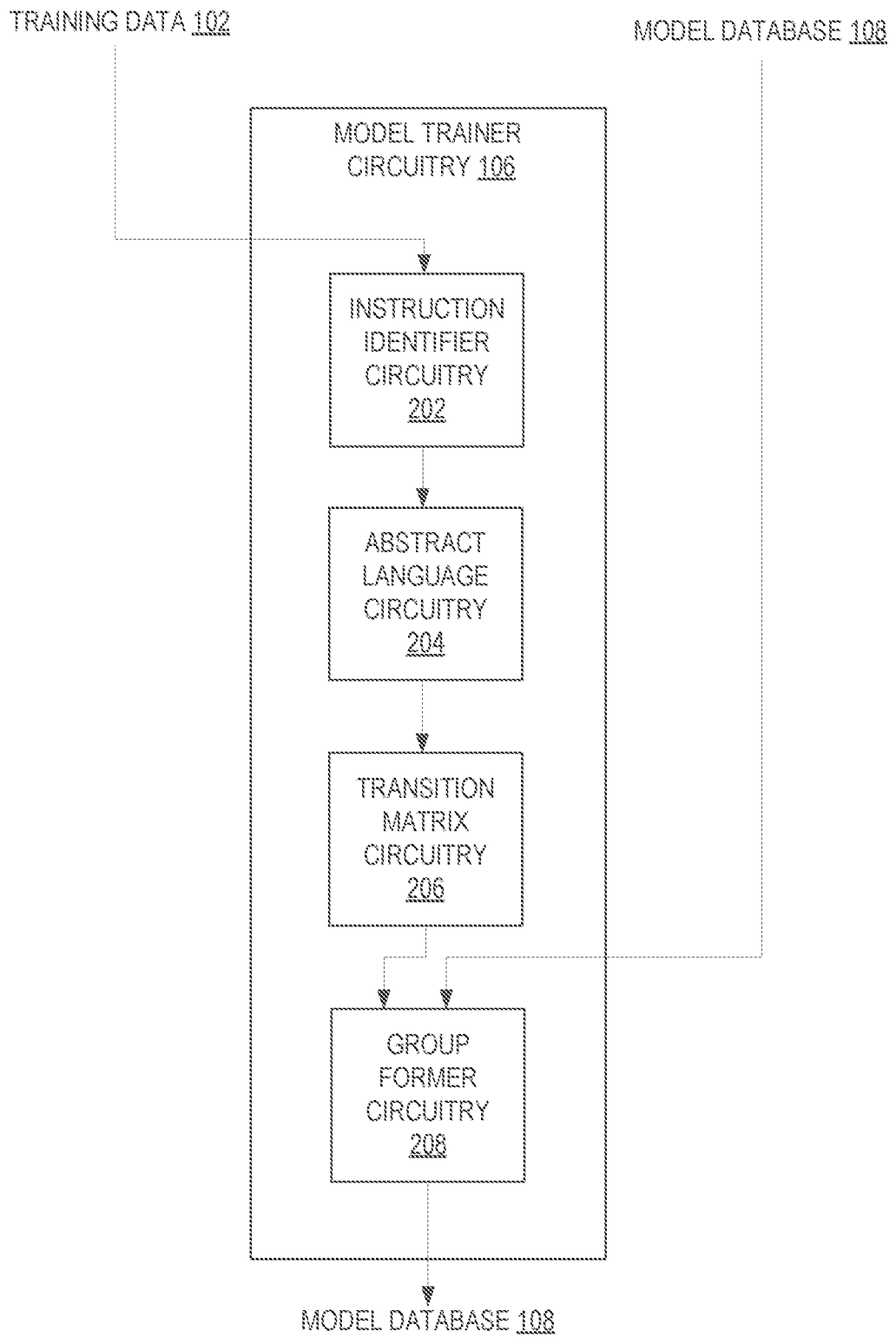
FIG. 2 is a block diagram of an example implementation of the model trainer circuitry of FIG. 1.

FIG. 2 is a block diagram of an example implementation of the model trainer circuitry of FIG. 1. The example model trainer circuitry 106 includes example instruction identifier circuitry 202, example abstract language circuitry 204, example transition matrix circuitry 206, and group former circuitry 208.

The example instruction identifier circuitry 202 accepts a sample and converts the sample into a sequence of instructions. The sequence of instructions may include operations and operands. The example instruction identifier circuitry 202 may convert the sample using a compiler program and/or an assembler program. The classified sample is disassembled into a sequence of instructions, where each instruction includes an operation code and one or more operands. An operation code is a basic unit of instruction that a processor may execute. Example operation codes may include, but are not limited to, 'jump', 'call', 'loop', 'add', 'subtract', 'multiply', 'divide', 'and', 'or', 'xor', 'not', etc. An operand is a value in memory that the execution is applied to or with. For example, if a processor executes an instruction to add the value of Register 1 to the value of Register 2, 'add' is the operation code, and both Register 1 and Register 2 are operands. The example instruction identifier circuitry 202 is explored further in FIG. 4.

The example abstract language circuitry 204 implements a clustering algorithm to form an abstract language representation of the sample using the sequence of instructions. The example abstract language circuitry 204 may use any type of clustering algorithm. Example types of clustering algorithms include, but are not limited to, k-means clustering, distribution clustering, or density clustering. The abstract language representation may be represented as an ordered list of states, where the order corresponds to the order of instructions as they are included in the sample.

In the abstract language representation, instructions with similar operation codes are grouped together. For example, instructions such as 'jump', 'call', 'loop', etc. may be grouped into a 'control' group. Similarly, instructions such as 'add', 'subtract', 'multiply', 'divide' may be grouped into a 'arithmetic' group and instructions such as 'and', 'or', 'xor', 'not' may be grouped into a 'logic' group. In some examples, the grouping of the instructions is additionally based on the one or more operands of each instruction. The abstract language representation may be represented as an ordered list of states, where the ordered list corresponds to the sequence of instructions that is disassembled from the classified sample and where each state is a group of instructions. The example abstract language circuitry 204 is explored further in FIG. 4.

The training data 102 represents a plurality of input samples. The example abstract language circuitry 204 forms an abstract language representation for each sample in the plurality. In some examples, the example abstract language circuitry 204 may be implemented across multiple processors or machines so that abstract language representations of one or more samples are formed in parallel. In other examples, the example abstract language circuitry 204 forms abstract language representations sequentially. In other examples, the example instruction identifier circuitry 202 accepts a singular input sample rather than a plurality.

The example transition matrix circuitry 206 creates a Markov transition matrix to represent transitions within an abstract language representation. A Markov transition matrix is a mathematical structure that describes the probability of transitioning from any state within a system to any other state within the system. For a given sample, the Markov transition matrix formed by the example transition matrix circuitry 206 describes, for each of the n states that form the abstract language, the probability of there being a transition between that state and a different state within the abstract language representation. The Markov transition matrix formed by the transition matrix circuitry is explored further in FIG. 6.

In the example model trainer circuitry 106 of FIG. 2, the example transition matrix circuitry 206 may accept a multitude of abstraction language representations. The example transition matrix circuitry 206 forms a Markov transition matrix for each abstract language representation in the plurality. In some examples, the example transition matrix circuitry 206 may be implemented across multiple processors or machines so that Markov transition matrices of one or more abstract language representations are formed in parallel. In other examples, the example transition matrix circuitry 206 forms Markov transition matrices sequentially. In other examples, the example transition matrix circuitry 206 accepts a singular abstract language abstraction rather than a plurality.

The example group former circuitry 208 of FIG. 2 accepts a Markov transition matrix corresponding to a sample from the training data 102. The example group former circuitry 208 determines how similar the Markov transition matrix is to two or more groups of other matrices. The example group former circuitry 208 determines which group among the two or more groups to place the Markov transition matrix in based on the similarity. If the Markov transition matrix does not exceed a similarity threshold, the example group former circuitry 208 may form a new group rather than putting the Markov transition matrix into one of the two or more pre-existing groups. The determinations made by the example group former circuitry are based on the classification of the sample, the Markov transition matrix, and the state of the example model database 108 before the placement. The group former circuitry 208 is explored further in FIGS. 4 and 5.

By accepting training data 102, forming Markov transition matrices from abstract language representations, and placing the Markov transition matrices in either a new or existing group, the example model trainer circuitry 106 forms a plurality of clean groups and a plurality of malicious groups. These pluralities are referred to a clean corpus and a malicious corpus, which collectively comprise the transition matrix model stored in the model database 108. The transition matrix model is used by example model executor circuitry 110 to classify unknown samples as clean or malicious. In some examples, the terms "classify" and "label" may be used interchangeably.

Figure 3:
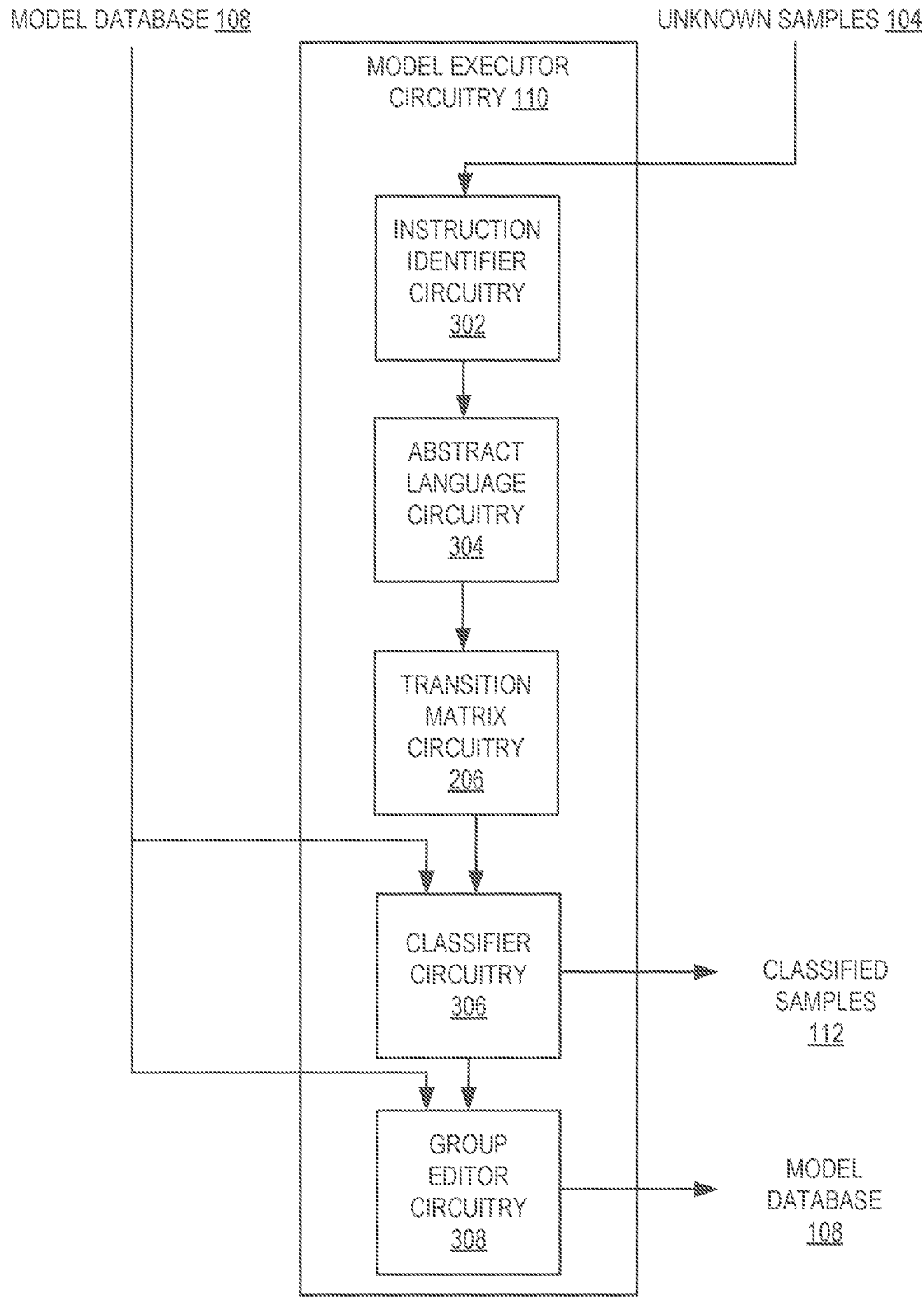
FIG. 3 is a block diagram of an example implementation of the model executor circuitry of FIG. 1.

FIG. 3 is a block diagram of an example implementation of the model executor circuitry of FIG. 1. The example model executor circuitry 110 includes the example instruction identifier circuitry 302, abstract language circuitry 304, example transition matrix circuitry 206, classifier circuitry 306, and example group editor circuitry 308.

The example instruction identifier circuitry 302 of FIG. 3 accepts an unknown sample that an example computer security software company or end user may seek to classify. Like the example instruction identifier circuitry 202, the example instruction identifier circuitry 302 converts the selected sample into a sequence of instructions, where each instruction includes an operation code and one or more operands. An operation code is a basic unit of instruction that a processor may execute. Example operation codes may include, but are not limited to, 'jump', 'call', 'loop', 'add', 'subtract', 'multiply', 'divide', 'and', 'or', 'xor', 'not', etc. An operand is a value in memory that the execution is applied to or with. For example, if a processor executes an instruction to add the value of Register 1 to the value of Register 2, 'add' is the operation code, and both Register 1 and Register 2 are operands. The example instruction identifier circuitry 302 is explored further in FIG. 8.

In some examples, the example model executor circuitry 110 includes means for converting a sample into a sequence of instructions. For example, the means for converting may be implemented by example instruction identifier circuitry 302. In some examples, the example instruction identifier circuitry 302 may be instantiated by processor circuitry such as the example processor circuitry 1012 of FIG. 10. For instance, the example instruction identifier circuitry 302 may be instantiated by the example general purpose processor circuitry 1100 of FIG. 11 executing machine executable instructions such as that implemented by at least blocks 802 of FIG. 8. In some examples, the example instruction identifier circuitry 302 may be instantiated by hardware logic circuitry, which may be implemented by an ASIC or the FPGA circuitry 1200 of FIG. 12 structured to perform operations corresponding to the machine readable instructions. Additionally or alternatively, the example instruction identifier circuitry 302 may be instantiated by any other combination of hardware, software, and/or firmware. For example, the example instruction identifier circuitry 302 may be implemented by at least one or more hardware circuits (e g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example abstract language circuitry 304 of FIG. 3 accepts the sequence of instructions that the example instruction identifier circuitry 302 creates. The example abstract language circuitry 304 uses a clustering algorithm to form an abstract language representation for the sequence of instructions. For a given sample sequence of instructions, the clustering algorithm used by the abstract language circuitry 304 forms the same abstract language representation as the abstract language circuitry 204 of FIG. 2. In the abstract language representation, instructions with similar operation codes are grouped together. For example, instructions such as 'jump', 'call', 'loop', etc. may be grouped into a 'control' group. Similarly, instructions such as 'add', 'subtract', 'multiply', 'divide' may be grouped into a 'arithmetic' group and instructions such as 'and', 'or', 'xor', 'not' may be grouped into a 'logic' group. In some examples, the grouping of the instructions is additionally based on the one or more operands of each instruction. The abstract language representation may be represented as an ordered list of states, where the ordered list corresponds to the sequence of instructions that is disassembled from the classified sample and where each state is a group of instructions.

In some examples, the example model executor circuitry 110 includes means for transforming a sequence of instructions into an abstract language representation. For example, the means for transforming may be implemented by example abstract language representation circuitry 304. In some examples, the example abstract language representation circuitry 304 may be instantiated by processor circuitry such as the example processor circuitry 1012 of FIG. 10. For instance, the example abstract language representation circuitry 304 may be instantiated by the example general purpose processor circuitry 1100 of FIG. 11 executing machine executable instructions such as that implemented by at least blocks 803 of FIG. 8. In some examples, the example abstract language representation circuitry 304 may be instantiated by hardware logic circuitry, which may be implemented by an ASIC or the FPGA circuitry 1200 of FIG. 12 structured to perform operations corresponding to the machine readable instructions. Additionally or alternatively, the example abstract language representation circuitry 304 may be instantiated by any other combination of hardware, software, and/or firmware. For example, the example abstract language representation circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example transition matrix circuitry 206 operates identically in both FIG. 2 and FIG. 3 by forming a Markov transition matrix to represent transitions within the abstract language representation.

In some examples, the example model executor circuitry 110 includes means for creating a Markov transition matrix. For example, the means for creating may be implemented by example transition matrix circuitry 206. In some examples, the example transition matrix circuitry 206 may be instantiated by processor circuitry such as the example processor circuitry 1012 of FIG. 10. For instance, the example transition matrix circuitry 206 may be instantiated by the example general purpose processor circuitry 1100 of FIG. 11 executing machine executable instructions such as that implemented by at least blocks 804 of FIG. 8. In some examples, the transition matrix circuitry 206 mas be instantiated by hardware logic circuitry, which may be implemented by an ASIC or the FPGA circuitry 1200 of FIG. 12 structured to perform operations corresponding to the machine readable instructions. Additionally or alternatively, the example transition matrix circuitry 206 may be instantiated by any other combination of hardware, software, and/or firmware. For example, the example transition matrix circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The classifier circuitry 306 of FIG. 3 classifies the sample within the unknown samples 104 as clean or malicious. The classification for a given sample is based on the Markov transition matrix and the example model database 108. The example classifier circuitry 306 is described further in FIG. 8.

In some examples, the example model executor circuitry 110 includes means for classifying an unknown sample as clean or malicious. For example, the means for classifying may be implemented by example classifier circuitry 306. In some examples, the example classifier circuitry 306 may be instantiated by processor circuitry such as the example processor circuitry 1012 of FIG. 10. For instance, the example classifier circuitry 306 may be instantiated by the example general purpose processor circuitry 1100 of FIG. 11 executing machine executable instructions such as that implemented by at least blocks 805-812 of FIG. 8. In some examples, the example classifier circuitry 306 may be instantiated by hardware logic circuitry, which may be implemented by an ASIC or the FPGA circuitry 1200 of FIG. 12 structured to perform operations corresponding to the machine readable instructions. Additionally or alternatively, the example classifier circuitry 306 may be instantiated by any other combination of hardware, software, and/or firmware. For example, the example classifier circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The group editor circuitry 308 accepts a classified sample and determines whether to add its Markov transition matrix to the example model database 108. The determination of a given sample is based on the Markov transition matrix, the sample's classification, and the transition matrix model stored in the example model database 108. The group editor circuitry is explored further in FIG. 8.

In some examples, the example model executor circuitry 110 includes means for adding an unknown sample to a group of transition matrices. For example, the means for adding may be implemented by example group editor circuitry 308. In some examples, the example group editor circuitry 308 may be instantiated by processor circuitry such as the example processor circuitry 1012 of FIG. 10. For instance, the example group editor circuitry 308 may be instantiated by the example general purpose processor circuitry 1100 of FIG. 11 executing machine executable instructions such as that implemented by at least blocks 814-816 of FIG. 8. In some examples, the group editor circuitry 308 may be instantiated by hardware logic circuitry, which may be implemented by an ASIC or the FPGA circuitry 1200 of FIG. 12 structured to perform operations corresponding to the machine readable instructions. Additionally or alternatively, the example group editor circuitry 308 may be instantiated by any other combination of hardware, software, and/or firmware. For example, the example group editor circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

By forming an abstract language representation and Markov transition matrix for each unknown sample, the example model executor circuitry 110 can classify the samples using disassembled code, offering an additional means of classification unavailable through previous solutions. Additionally, the group editor circuitry 308 may add the Markov transition matrix representing the now classified sample to the example model database 108, ensuring that the model remains representative of the unknown samples 104 it seeks to classify.

Figure 4:
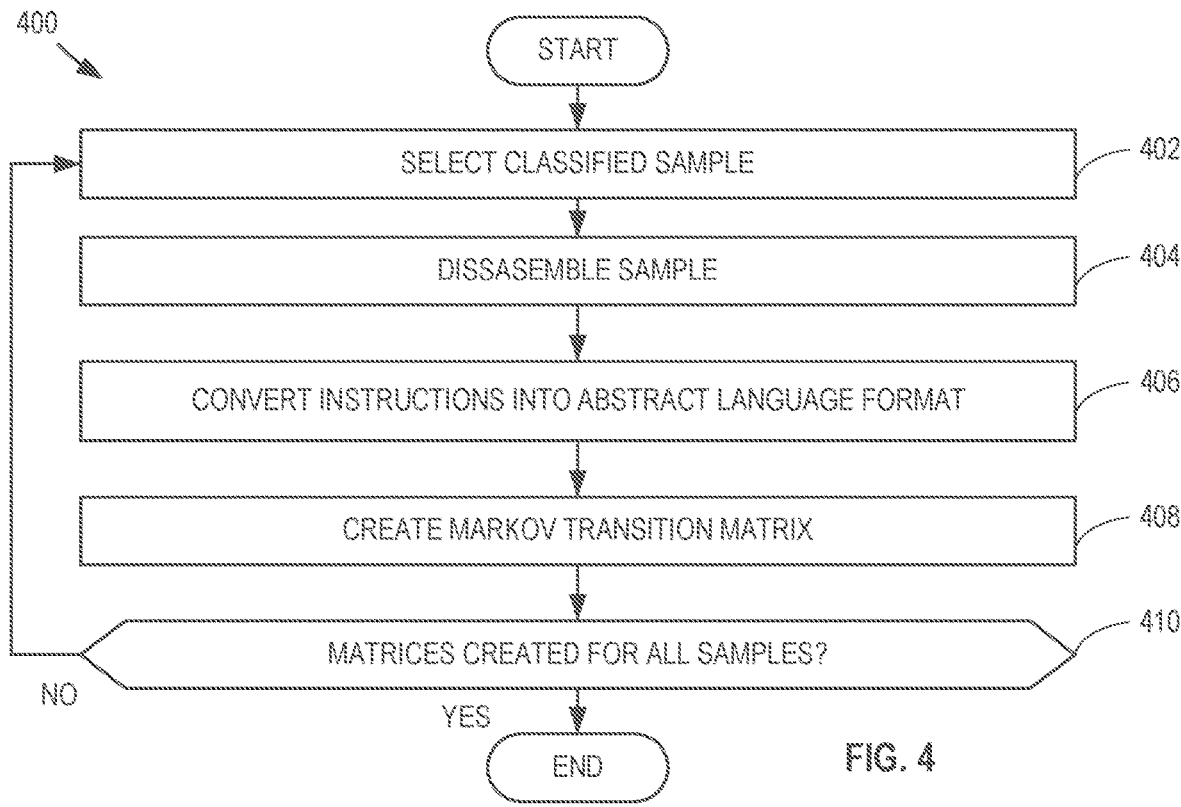
FIG. 4 is a flowchart representative of example machine readable instructions that may be executed by the model trainer circuitry of FIG. 1 to create Markov transition matrices.
Figure 8:
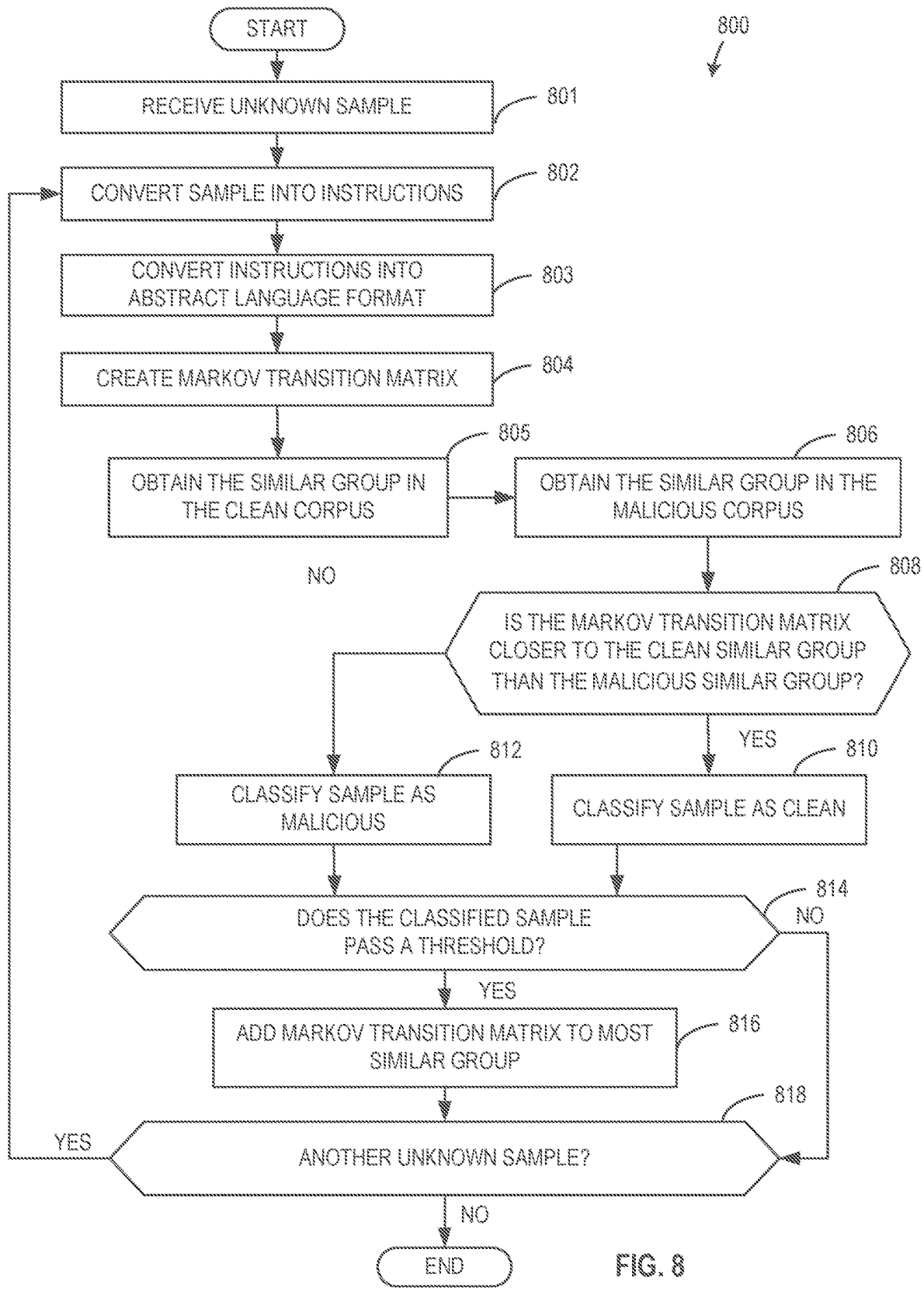
FIG. 8 is a flowchart representative of example machine readable instructions that may be executed by example processor circuitry to implement the model executor circuitry of FIG. 1.

Flowcharts representative of example hardware logic circuitry, machine readable instructions, hardware implemented state machines, and/or any combination thereof for implementing the example system 100 of FIG. 1 are shown in FIG. 4 and FIG. 8. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example system 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "as least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions that may be executed by the model trainer circuitry of FIG. 2 to create Markov transition matrices. The example process 400 begins when the example instruction identifier circuitry 202 selects a classified sample. (Block 402). The classified sample is part of the training data 102 and is classified either clean or malicious.

The example instruction identifier circuitry 202 converts the selected sample into a sequence of instructions. (Block 404). The sequence of instructions contain operands and operations as described in FIG. 2.

The example abstract language circuitry 204 implements a clustering algorithm to form an abstract language representation of the sequence of instructions. (Block 406). The abstract language representation groups the operations and operations into states as described in FIG. 2.

The clustering algorithm implemented by the example abstract language circuitry 204 maps all the samples from the training data 102 to a single set of abstract language states. Because operation codes are architecture specific, the mapping of a set of opcodes to the abstract languages is architecture specific. For example, the set of operation codes on a 64-bit ARM processor that map to a 'control' state may be different from the set of operation codes on a x86 processor that map to the same 'control' state. As a result, a first sample implemented by a first processor running a first architecture may map to the same abstract language states as a second sample implemented by a second processor running a second architecture. By supporting architecture specific mappings between operation codes and abstract language states, the Markov transition matrices of different architectures are more likely to be compatible for comparison.

The example transition matrix circuitry 206 accepts the abstract language representation of a sample from the example abstract language circuitry and forms a Markov transition matrix. (Block 408). The Markov transition matrix describes, for each state that forms the abstract language, the probability of there being a transition between that state and a different state within the abstract language representation. The example transition matrix circuitry 206 uses a support mechanism such as a dictogram to create the Markov transition matrix. The Markov transition matrix is explored further in FIG. 6.

The example instruction identifier circuitry 202 determines whether a Markov transition matrix has been created for each sample within the training data 102. If a Markov transition matrix has not been created for each sample within the training data 102, the example process 400 proceeds to block 402, where the example instruction identifier circuitry 202 selects a classified sample that does not have an accompanying Markov transition matrix. If a Markov transition matrix has been created for each sample within the training data 102, the example process ends.

In the example process 400, the example model trainer circuitry 106 creates Markov transition matrices sequentially using block 410. In some examples, the example model trainer circuitry 106 is composed of multiple machines or processors that execute blocks 402-408 to create Markov transition matrices in parallel.

While an example manner of implementing the system 100 of FIG. 1 is illustrated in FIG. 4, one or more of the elements, processes, and/or devices illustrated in FIG. 1 may be combined, divided, re-arranged, omitted, eliminated, and/or implemented in any other way. Further, the example model trainer circuitry 106, the example model executor circuitry 110, and/or, more generally, the example system 100 of FIG. 1, may be implemented by hardware alone or by hardware in combination with software and/or firmware. Thus, for example, any of the example model trainer circuitry 106, the example model executor circuitry 110, and/or, more generally, the example system 100 of FIG. 1, could be implemented by processor circuitry, analog circuit(s), digital circuit(s), logic circuit(s)., programmable processors), programmable microcontrollers), graphics processing unit(s) (GPU(s)), digital signal processors) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example system 100 of FIG. 1 may include one or more elements, processes, and/or devices in addition to. or instead of, those illustrated in FIG. 4. and/or may include more than one of any or all of the illustrated elements, processes and devices.

Figure 5:
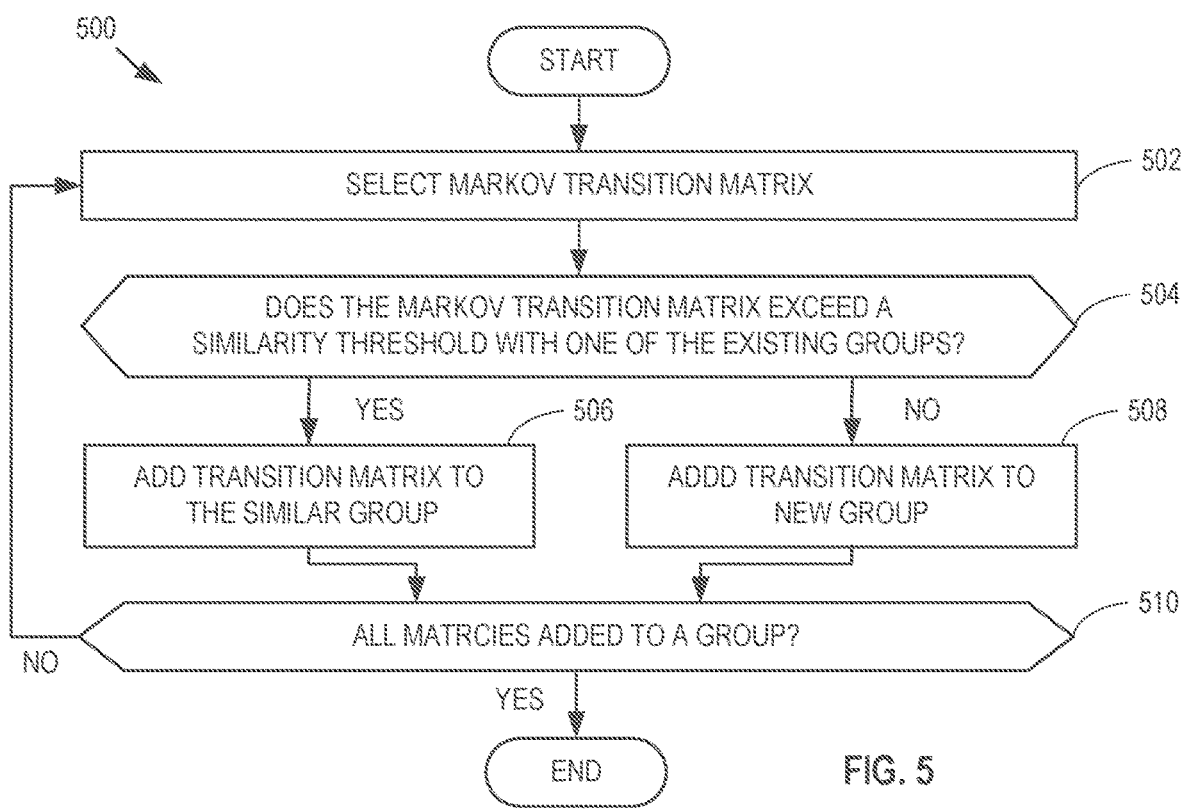
FIG. 5 is a flowchart representative of example machine readable instructions that may be executed by the model trainer circuitry of FIG. 1 to train a transition matrix model.

FIG. 5 is a flowchart representative of example machine readable instructions that may be executed by the model trainer circuitry of FIG. 1 to train a transition matrix model. The example process 500 begins when the example group former circuitry 208 selects a Markov transition matrix. (Block 502). The Markov transition matrix is created by the example transition matrix circuitry 206 in the example process 400.

The group former circuitry 208 determines a difference value between the Markov transition matrix of the classified sample and the average Markov transition matrix of each group in the sample's corpus. (Block 504). The difference value between two matrices indicates how similar the matrices are, where a smaller value indicates that the matrices are more similar (e.g., a value close to zero, on a scale of zero to one), and a larger value (e.g., a value close to one, on the scale of zero to one). In some examples, the rules or procedures for determining a difference value may include mathematical operations such as but not limited to matrix distance calculations, reduced row echelon formation, and/or elementwise matrix algebra.

If the difference value with one or more groups meets or exceeds a threshold, then the Markov transition matrix of the classified sample is added to the similar group. (Block 506). The similar group is the group with the lowest difference value between the group and the Markov transition matrix. By adding the Markov transition matrix to a group, the average Markov transition matrix of said group changes, which influences the group forming and classification processes of future samples. In the example process of FIG. 4, the difference value between Markov transition matrices from the classified sample and a group average must be less than or equal to 5% to meet or exceed the threshold. In some examples, a different threshold is used.

If none of the difference values meet or exceed a threshold, a new group is created in the corpus. (Block 508). The new group uses the Markov transition matrix of the classified sample as a seed and can have other Markov transition matrices added to the group if the difference value between them meets or exceeds a threshold. Because no groups are initially present in the clean corpus, the first sample classified as clean to be added to the example model database 108 will be the seed of a first group in the clean corpus 702. The second sample classified as clean may be added to the first group or may be the seed of a second group within the clean corpus 702. Similarly, the first sample classified as malicious to be added to the example model database 108 will be the seed of a first group in the malicious corpus 704.

The example group former circuitry 208 determines whether additional classified samples in the training data 102 exist to be added to the example model database 108. (Block 510). If any additional samples exist to be added, all the samples have been added, then the example model database 108 is complete, and the example process 500 ends. If all the samples have not been added, then the example process 500 continues at block 404 where the example group former circuitry 208 selects a Markov transition matrix that is not yet in the transition matrix model.

FIG. 6 is an example data set used to illustrate the transition matrix circuitry of FIGS. 2, 3. The example data set of FIG. 6 includes an example abstract language representation 602, an example dictogram 604, and an example Markov transition matrix 606.

The example abstract language representation 602 of FIG. 6 is an example output of the example abstract language circuitry 204. In the example data set of FIG. 6, the abstract language has a total of 6 states, where each state represents a different group of instructions. The abstract language additionally includes a start state and end state, which represent the beginning and end of the sample file, respectively. The abstract language representation is read left to right, where each number represents the index of the group that a particular group of instructions were assigned to. For example, in the example abstract language representation 602, the first set of instructions from the sample were assigned to group 4, the second set assigned to group 1, the third set assigned to group 4, etc.

In the example system 100, it is possible for an abstract language state to appear two or more times consecutively. In some examples, the consecutive appearance is due to each group having a maximum number of instructions that can be assigned to it. In other examples, there is no limit on the number of instructions that may be assigned to a group. In these examples, an abstract language state may still appear two or more times consecutively if the operands of the instructions or the particular sequence of instructions within a group contribute to the mapping between instructions and groups. In general, the mapping between disassembled samples and an abstract language representation may be context specific and may be changed to alter the sensitivity of the example system 100.

The example dictogram 604 of FIG. 6 counts the number of transitions between states and represents the information in a matrix format. In some examples, the dictogram is any method used by example transition matrix circuitry 206 to record state transitions and aide in the construction of a Markov transition matrix. In the example dictogram 604, the value at any row x, column y, indicates the number of times that a transition from state x to state y occurred in the example abstract language representation 602. For example, the value of row 4, column 1 in the example dictogram 604 indicates that the example abstract language representation 602 contains 6 transitions from state 4 to state 1.

The example Markov transition matrix 606 shows the probabilities of there being a transition from any one state to any other state in the example abstract language representation 602. Similar to the dictogram, the value at any row x, column y, indicates the probability that the next state within the example abstract language representation 602 is y, given that the current state is x. For example, the value at row 4, column 1 of the Markov transition matrix 606 indicates that if a given state in the example abstract language representation 602 is 4, there is a 46% percent chance that the next state is 1. The probabilities in the Markov transition matrix 606 are computed using the example dictogram 604. For a given value at row x, column y, the probability value in the Markov transition matrix 606 is found by dividing the count at the same x, y coordinates of the example dictogram 604 by the sum of all counts in row x of the example dictogram 604. For example, at row 4, column 1, $6/(6+1+5+1) \approx 0.46$.

In the example system 100, any sample that was used to train the example model database 108 or was classified by the example model database 108 used the same abstract language with a total of 6 groups. However, a new abstract language representation, dictogram, and Markov model database are formed for each sample. This means that while states 2 and 5 are not present in the example data set of FIG. 6, they may be present in another sample that uses the same model database 108. The Markov transition matrix 606 therefore includes the probabilities of transitions to/from states 2 and 5, even though they are 0, so that it remains compatible with all other Markov transition matrices that are used to train or be classified by the same model database 108 that includes the example data set of FIG. 6.

In the example system 100, the Markov transition matrices are of first order. This means that the probability of any current (i.e., 1th) state in an abstract language representation being a particular state is dependent only on the immediately previous state (i.e., the i-1th state) in other examples, the Markov transition matrices are of a higher order. In these examples, the probability of any current (i.e., 1th) state in an abstract language representation being a particular state is dependent on more than one previous state (i.e., the i-1th, i-2th, etc. states). The number of previous states that the current state's probability depends on is equivalent to the number order of the Markov transition matrix. For example, a third order Markov transition matrix computes the probability of an 1th state based on the i-1th, i-2th, and i-3th states. The order of the Markov transition matrices may be context specific and may be changed to alter the sensitivity of the example system 100.

By using the example dictogram 604, the example transition matrix circuitry 206 can represent the example abstract language representation 602 as a Markov transition matrix 606. The format of a Markov transition matrix allows the information in each sample to be compared to that of other samples, which enables the training of and classification by the example model database 108.

Figure 7:
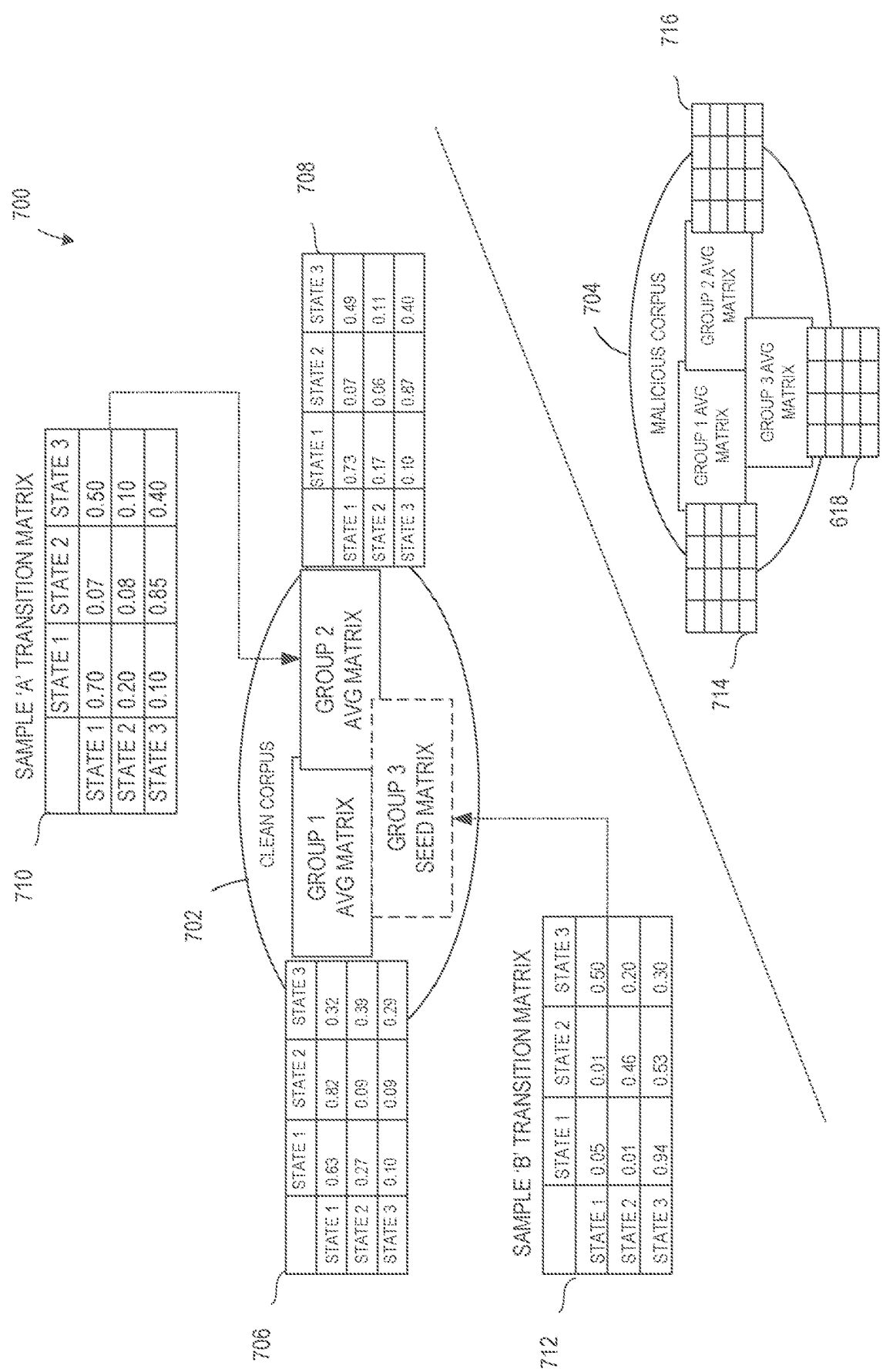
FIG. 7 is an example data set that may be implemented by the model trainer circuitry of FIG. 1 to train a transition matrix model.

FIG. 7 is an example data set that may be implemented by the model trainer circuitry of FIG. 1 to train the model database of FIG. 1. The example data set 700 includes a clean corpus 702, a malicious corpus 704, clean group 1 average matrix 706, clean group 2 average matrix 708, sample A transition matrix 710, sample B transition matrix 712, and malicious group average matrices 714-618.

In the example data set 700, all samples used to train the model database and all samples classified by the example model database 108 use an abstract language with a total of 3 states. Additionally, the abstract language of example data set 700 does not include a start or end state. The number and types of states in an abstract language may be context specific and may be changed to alter the sensitivity of the example system 100.

The clean corpus 702 refers to the set of all clean Markov transition matrices and clean groups within the example model database 108. Similarly, the malicious corpus 704 refers to the set of all malicious Markov transition matrices and malicious groups within the example model database 108. Because all samples from the training data 102 are classified, their status as clean or malicious are known before being added to the example model database 108. Therefore, the example group former circuitry 208 only adds a Markov transition matrix to its matching corpus (i.e., matrices from clean samples are added to the clean corpus 702 and matrices from the malicious samples are added to the malicious corpus 704).

In the example data set 700, the example group former circuitry 208 has added a number Markov transition matrices to the clean corps 702 before adding the sample A transition matrix 710 and sample B transition matrix 712. These previous Markov transition matrices form the clean group 1 average matrix 706 and clean group 2 average matrix 708 values shown in the example data set 700.

When adding the sample A transition matrix 710, which also corresponds to a clean sample from the training data 102, the example group former circuitry 208 determines a first difference value and a second difference value. The first difference value is a percentage value that indicates the difference between the sample A transition matrix 710 and the clean group 1 average matrix 706. Similarly, the second difference value is a percentage value that indicates the difference between the sample A transition matrix 710 and the clean group 2 average matrix 708. By comparing the first difference value to the second difference value, the example group former circuitry 208 determines that the sample A transition matrix 710 is more similar to clean group 2 than to clean group 1.

The group former circuitry 208 compares the second difference value to a threshold. In the example data set 700, the threshold requires the difference value between a Markov transition matrix and a group average matrix be 5% or less, where a smaller percentage indicates that the two matrices are more similar. In other examples, the threshold requires a value other than 5%. The group former circuitry 208 adds the sample A transition matrix 710 to the similar group, clean group 2. The addition of the Markov transition matrix influences the clean group 2 average matrix 708, which will influence the placement of additional clean samples into the clean corpus 702.

When the example group former circuitry 208 adds sample B transition matrix 712 to clean corpus 702, a third difference value between it and the clean group 1 average matrix 706 is calculated and a fourth difference value between it are calculated. Both the third difference value and fourth difference value fail to meet or exceed the threshold of being less than 5%. As a result, the sample B transition matrix 712 forms a third clean group is used as the seed of the clean group 3 average matrix.

Training data samples classified as malicious may be added to the example model database 108 before, intermittent with, or after sample A transition matrix 710 and sample B transition matrix 712 are added to the example model database 108. The group former circuitry 208 adds the malicious Markov transition matrices to the malicious corpus 704 in the same manner that the sample A transition matrix 710 and sample B transition matrix 712 are added to the clean corpus 702. The addition of Markov transition matrices result in three malicious groups, whose malicious group average matrices 714-618 have been abstracted in FIG. 7 for simplicity.

Any future samples from the training data 102 may be added to an existing group within its matching corpus or may form a new group within the matching corpus, based on whether the similar group in the matching corpus meets or exceeds the threshold. Once all samples from the training data 102 have been added to a group or formed a new group within the matching corpus, the training of the example model database 108 is complete.

FIG. 8 is a flowchart representative of example machine readable instructions that may be executed by example processor circuitry to implement the model executor circuitry of FIG. 1. The example process 800 begins when the example instruction identifier circuitry 302 receives an unknown sample. (Block 801). The unknown sample may be provided by an encompassing computer security software program running on an internet capable device, which seeks to classify the sample as clean or malicious.

In the example process 800, the example instruction identifier circuitry 302 disassembles the unknown sample into a sequence of instructions (Block 802). Block 802 operates identically to block 404 in FIG. 4.

The abstract language circuitry 304 converts the sequence of instructions into an abstract language representation (Block 803). The example abstract language circuitry 304 uses a rule set included in the transition matrix model and developed by the abstract language circuitry 204 to form an abstract language representation for the sequence of instructions.

The example transition matrix circuitry 206 uses the abstract language representation of block 803 to form a Markov transition matrix (Block 804). Block 804 operates identically to block 408 in FIG. 4.

The example classifier circuitry 306 obtains the similar group within the clean corpus (Block 805). The similar group is found by comparing the difference values between the Markov transition matrix of the unknown sample and the average Markov transition matrix of each group within the clean corpus. The group with the lowest difference value is considered the similar group in the clean corpus. By using the same process of comparing difference values to find the lowest value, the example classifier circuitry 306 also obtains the similar group within the malicious corpus. (Block 806). The example classifier circuitry 306 determines a difference value using a rule set included in the transition matrix model and determined by the example group former circuitry 208.

The example classifier circuitry 306 determines if the Markov transition matrix is closer to the clean similar group than the malicious similar group. (Block 808). The determination of block 808 is made by comparing the difference values between the Markov transition matrix of the unknown sample and the average Markov transition matrix of the both similar groups, where the group with the lower difference value is closer.

If the Markov transition matrix is closer to the clean similar group than the malicious similar group, the example classifier circuitry 306 classifies the unknown sample as clean (Block 810). Similarly, if the Markov transition matrix is closer to the malicious similar group than the clean similar group, the example classifier circuitry 306 classifies the unknown sample as malicious. (Block 812).

The example group editor circuitry 308 determines if the newly classified sample meets or exceeds a threshold (Block 814). In the example process 800, newly classified sample meets or exceeds a threshold if the difference value between the similar group to the newly classified sample is less than or equal to 1%. In other examples, an alternative difference value is used in block 814.

If the newly classified sample does meet or exceed the threshold of block 814, the Markov transition matrix of the newly classified sample adds the Markov transition matrix to the similar group via the network 107. (Block 816). The addition of the Markov transition matrix influences the classification of additional unknown samples. The threshold indicates that the example computer security software company is confident that the new classification of the previously unknown sample is accurate. By adding an accurate classification to a group, the example model database 108 becomes more representative of the newly classified sample and is more likely to accurately identify similar unknown samples in the future. If the newly classified sample does not meet or exceed the threshold of block 814, the example process 800 skips block 816.

The example abstract language circuitry 204 determines if another unknown sample has been received by the computer security software. (Block 818). If another unknown sample has not been received, the example process 800 ends. If another unknown sample has been received, the example process 800 continues at block 404 where the example instruction identifier circuitry 202 disassembles the unknown sample into a sequence of instructions.

Figure 9:
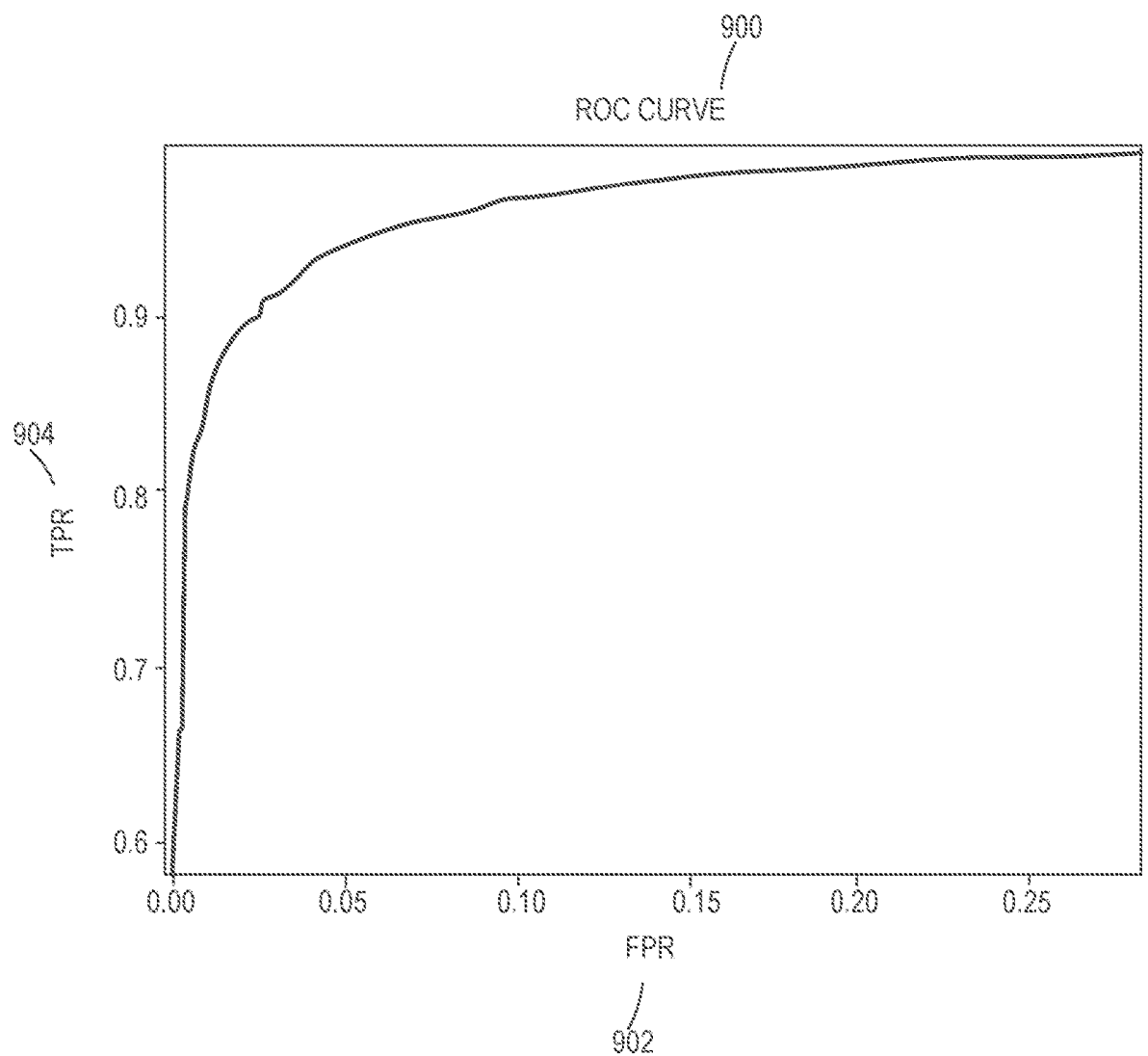
FIG. 9 includes a graph with a receiver operating characteristic (ROC) curve to describe the performance of the example transition matrix classifier circuitry of FIG. 1.

FIG. 9 includes a graph with a receiver operating characteristic (ROC) curve to describe the performance of the example system 100 of FIG. 1. The graph 900 plots the false positive rate 902 on the x axis and the true positive rate 904 on the y axis. The graph shows that the transition matrix classifier circuitry 206 can correctly identify over 90% of true positive samples while falsely classifying a clean sample as malicious less than 05% of the time. Furthermore, the true positive rate 904 continually increases towards 100% as the false positive rate 902 increases.

Figure 10:
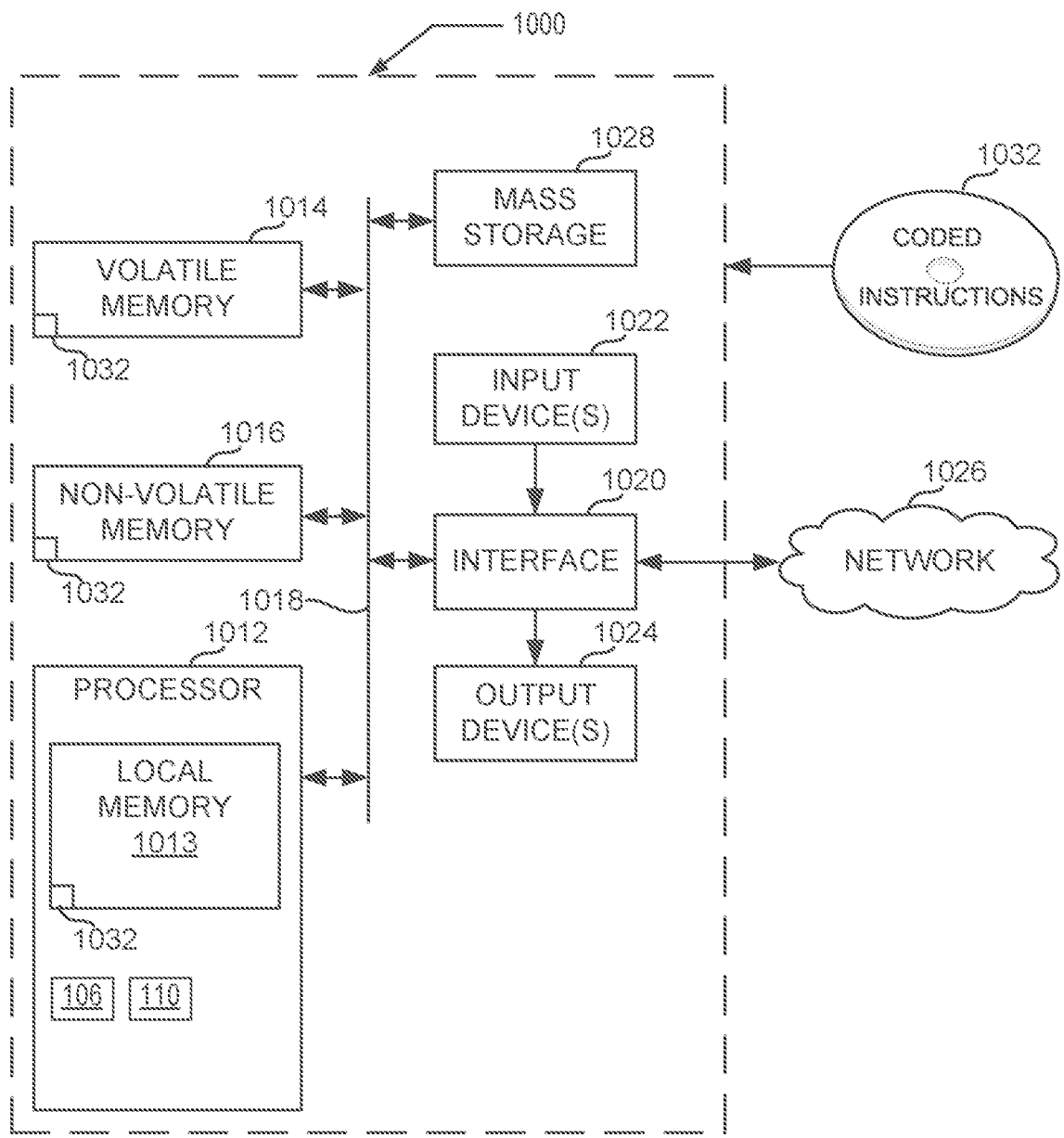
FIG. 10 is a block diagram of an example processing platform including processor circuitry structured to execute the example machine readable instructions of FIGS 4 and/or 7 to implement the transition matrix classifier circuitry of FIG. 1.

FIG. 10 is a block diagram of an example processor platform 1000 structured to execute and/or instantiate the machine readable instructions and/or operations of FIGS. 4, 7 to implement the example system 100 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) , a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs. DSPs, and/or microcontrollers from any desired family or manufacturer. The processor circuitry 1012 may be implemented by one or more semiconductor based (e.g., silicon based) devices. In this example, the processor circuitry 1012 implements example model trainer circuitry 106 and example model executor circuitry 110.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 4, 5, and 8 may be stored in the mass storage device 1028, in the volatile memory 1014, in the non-volatile memory 1016, and/or on a removable non-transitory computer readable storage medium such as a CD or DVD.

Figure 11:
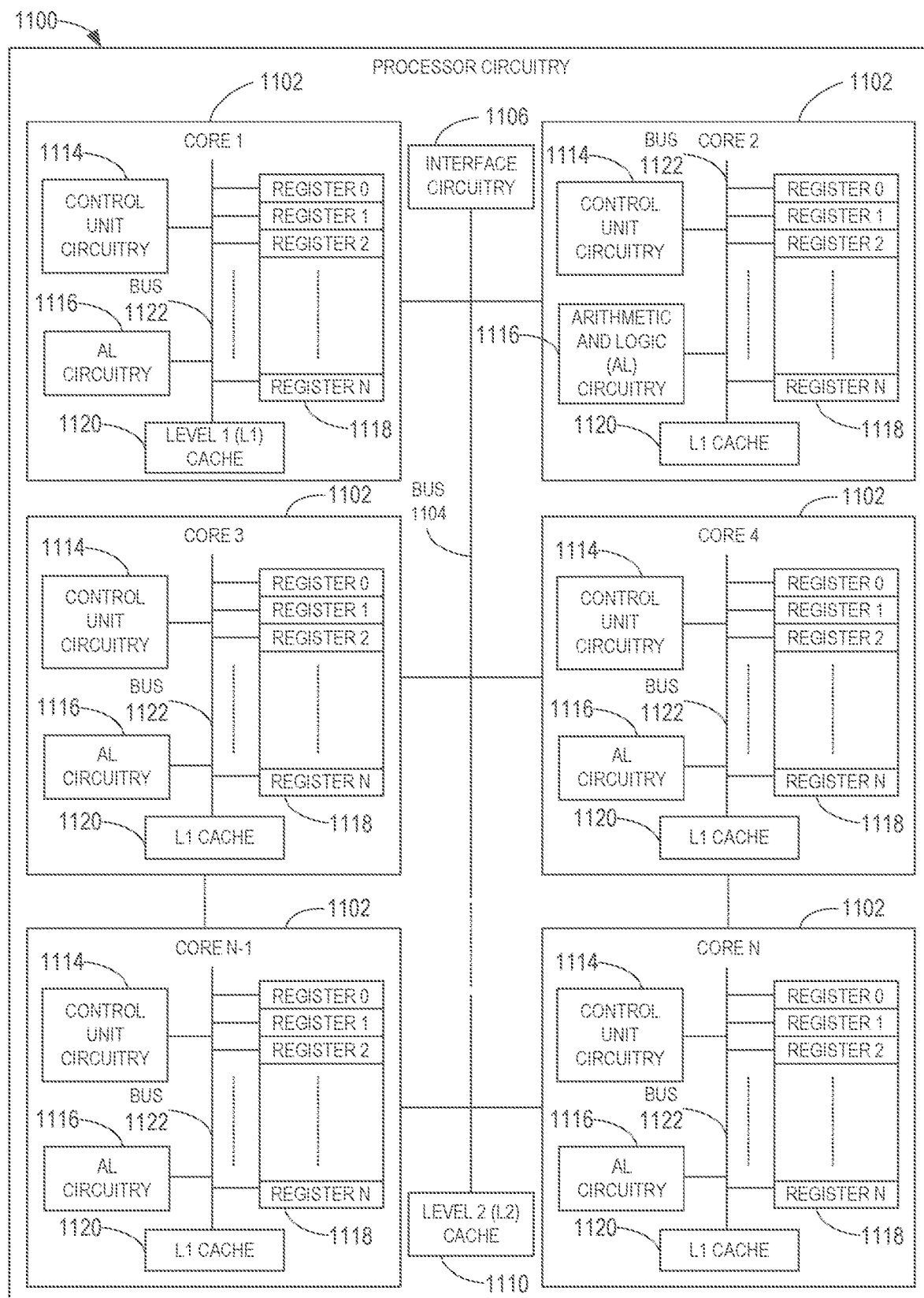
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a general purpose microprocessor 1100. The general purpose microprocessor circuitry 1100 executes some or all of the machine readable instructions of the flowchart of FIGS. 4 and/or 7 to effectively instantiate the circuitry of FIG. 1 as logic circuits to perform the operations corresponding to those machine readable instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIGS. 4, 7.

The cores 1102 may communicate by an example bus 1104. In some examples, the bus 1104 may implement a communication bus to effectuate communication associated with one(s) of the cores 1102. For example, the bits 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s) instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1122 may implement at least one of I2C bus, SPI bus, a PCI bus or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
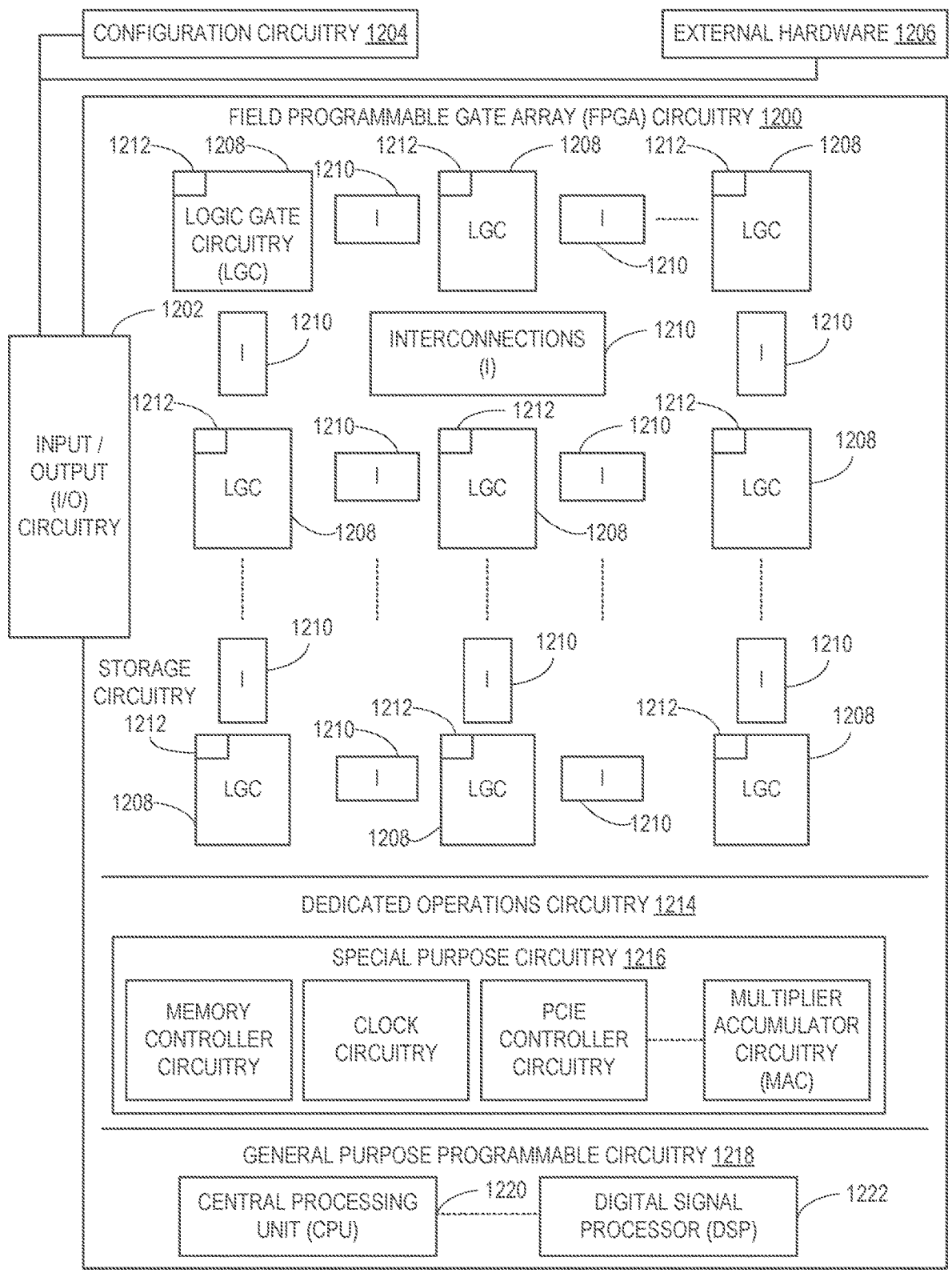
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 4, 5, and 8 but whose interconnections and logic circuity are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 4, 5, and 8. In particular, the FPGA 1200 may thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 4, 7. As such, the FPGA circuitry 1200 may be structured to effectively instantiate some or all of the machine readable instructions of the flowcharts of FIGS. 4, 5 and 8 as dedicated logic circuits to perform the operations corresponding to those software instructions in a dedicated manner analogous to an ASIC. Therefore, the FPGA circuit 1200 may perform the operations corresponding to the some or all of the machine readable instructions of flowcharts of FIGS. 4, 5, and 8 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12. includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 mas implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 4, 5, and 8 and/or other desired operations. The logic gate circuitry 1108 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 10 and 11 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 4, 5, and 8 may be executed by one or more of the cores 1102 of FIG. 11 and a second portion of the machine readable instructions represented by the flowcharts of FIGS. 4, 5, and 8 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 11 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
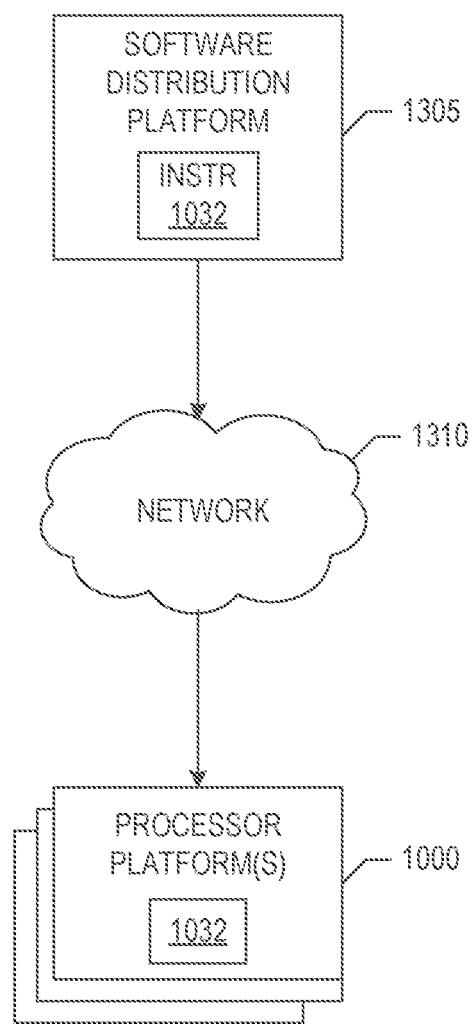
FIG. 13 is a block diagram of an example software distribution platform (e.g., one or more servers) to distribute software (e.g., software corresponding to the example machine readable instructions of FIGS. 4, 5, and 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 402-418, 802-818 of FIGS. 4, 7, as described above. The one or more servers of the example software distribution platform 1305 are in communication with a network 1310, which may correspond to any one or more of the Internet and/or any of the example network 107 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 402-410, 502-510, and 801-818 of FIGS. 4, 5, and 8, may be downloaded to the example processor platform 1000, which is to execute the machine readable instructions 1032 to implement the example system 100. In some example, one or more servers of the software distribution platform 1305 periodically offer, transmit, and/or force updates to the software (e.g., the example machine readable instructions 1032 of FIG. 10) to ensure improvements, patches, updates, etc, are distributed and applied to the software at the end user devices.

From the foregoing, it will be appreciated that example systems, methods, apparatus, and articles of manufacture have been disclosed that classify a sample as clean or malicious. The disclosed systems, methods, apparatus, and articles of manufacture improve the efficiency of using a computing device by analyzing low level subject matter. In doing so, the disclosed materials provide a manner of classifying malware that is not achievable using previous solutions. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to classify samples as clean or malicious are disclosed herein. Further examples and combinations thereof include the following.

Example 1 includes an apparatus to classify samples as clean or malicious comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate instruction identifier circuitry to convert a sample into a sequence of instructions, abstract language circuitry to transform the sequence of instructions into an abstract language representation, transition matrix circuitry to create a Markov transition matrix, the Markov transition matrix to represent transitions within the abstract language representation, and classifier circuitry to classify an unknown sample as clean or malicious, the classification in response to whether the Markov transition matrix is closer to a clean group of Markov transition matrices or a malicious group of Markov transition matrices.

Example 2 includes the apparatus of example 1, wherein the clean group of Markov transition matrices is one of a corpus of clean groups and the malicious group of Markov transition matrices if one of a corpus of malicious groups.

Example 3 includes the apparatus of example 1, wherein the classifier circuitry is to calculate a first difference value between the Markov transition matrix and the clean group of Markov transition matrices, and a second difference value between the Markov transition matrix and the malicious group of Markov transition matrices.

Example 4 includes the apparatus of example 3, wherein the Markov transition matrix is closer to the clean group of Markov transition matrices if the first difference value is lower than the second difference value.

Example 5 includes the apparatus of example 4, wherein the classifier circuitry is to classify the unknown sample as clean if the first difference value meets a first threshold.

Example 6 includes the apparatus of example 3, further including group editor circuitry to add the unknown sample to the clean group of Markov transition matrices, the addition in response at the first difference value meets a second threshold.

Example 7 includes the apparatus of example 1, wherein the Markov transition matrix is of first order.

Example 8 includes the apparatus of example 1, wherein the Markov transition matrix is of an order higher than one.

Example 9 includes the apparatus of example 1, wherein the sequence of instructions includes operations and operands, wherein to transform the sequence of instructions into an abstract language representation, the abstract language circuitry is to implement a clustering algorithm to group the operations and operands into a sequence of abstract language states.

Example 10 includes the apparatus of example 9, wherein the sample is a first sample implemented by a first processor running a first architecture, further including a second sample implemented by a second processor running a second architecture, wherein the abstract language states used to describe the first sample are the same abstract language states used to describe the second sample.

Example 11 includes At least one non-transitory machine-readable medium comprising instructions that, when executed, cause at least one processor to at least convert a sample into a sequence of instructions, transform the sequence of instructions into an abstract language representation, create a Markov transition matrix, the Markov transition matrix to represent transitions within the abstract language representation, and classify an unknown sample as clean or malicious, the classification in response to whether the Markov transition matrix is closer to a clean group of Markov transition matrices or a malicious group of Markov transition matrices Example 12 includes the as least one non-transitory machine-readable medium of example 11, wherein the clean group of Markov transition matrices is one of a corpus of clean groups and the malicious group of Markov transition matrices if one of a corpus of malicious groups.

Example 13 includes the at least one non-transitory machine-readable medium of example 11, wherein the instructions, when executed, cause at least one processor to calculate a first difference value between the Markov transition matrix and the clean group of Markov transition matrices, and a second difference value between the Markov transition matrix and the malicious group of Markov transition matrices.

Example 14 includes the at least one non-transitory machine-readable medium of example 13, wherein the Markov transition matrix is closer to the clean group of Markov transition matrices if the first difference value is lower than the second difference value.

Example 15 includes the at least one non-transitory machine-readable medium of example 14, wherein the instructions, when executed, cause the at least one processor to classify the unknown sample as clean if the first difference value meets a first threshold.

Example 16 includes the at least one non-transitory machine-readable medium of example 13, wherein the instructions, when executed, cause the at least one processor to add the unknown sample to the clean group of Markov transition matrices, the addition in response to the first difference value meets a second threshold.

Example 17 includes the at least one non-transitory machine-readable medium of example 11, wherein the Markov transition matrix is of first order.

Example 18 includes the at least one non-transitory machine-readable medium of example 11, wherein the Markov transition matrix is of an order higher than one.

Example 19 includes the at least one non-transitory machine-readable medium of example 11, wherein the sequence of instructions includes operations and operands, wherein to transform the sequence of instructions into an abstract language representation, the instructions, when executed, cause the at least one processor to implement a clustering algorithm to group the operations and operands into a sequence of abstract language states.

Example 20 includes the at least one non-transitory machine-readable medium of example 19, wherein the sample is a first sample implemented by a first processor running a first architecture, further including a second sample implemented by a second processor running a second architecture, wherein the abstract language states used to describe the first sample are the same abstract language states used to describe the second sample.

Example 21 includes a method to classify a sample as clean or malicious, the method comprising converting the sample into a sequence of instructions, transforming the sequence of instructions into an abstract language representation, creating a Markov transition matrix, the Markov transition matrix to represent transitions within the abstract language representation, and classifying an unknown sample as clean or malicious, the classification in response to whether the Markov transition matrix is closer to a clean group of Markov transition matrices or a malicious group of Markov transition matrices.

Example 22 includes the method of example 21, wherein the clean group of Markov transition matrices is one of a corpus of clean groups and the malicious group of Markov transition matrices if one of a corpus of malicious groups.

Example 23 includes the method of example 21, further including calculating a first difference value between the Markov transition matrix and the clean group of Markov transition matrices, and a second difference value between the Markov transition matrix and the malicious group of Markov transition matrices.

Example 24 includes the method of example 23, wherein the Markov transition matrix is closer to the clean group of Markov transition matrices if the first difference value is lower than the second difference value.

Example 25 includes the method of example 24, further including classifying the unknown sample as clean if the first difference value meets a first threshold.

Example 26 includes the method of example 23, further including adding the unknown sample to the clean group of Markov transition matrices, the addition in response to the first difference value meets a second threshold.

Example 27 includes the method of example 21, wherein the Markov transition matrix is of first order.

Example 28 includes the method of example 21, wherein the Markov transition matrix is of an order higher than one.

Example 29 includes the method of example 21, wherein the sequence of instructions includes operations and operands, wherein to transform the sequence of instructions into an abstract language representation, the method further includes implementing a clustering algorithm to group the operations and operands into a sequence of abstract language states.

Example 30 includes the method of example 29, wherein the sample is a first sample implemented by a first processor running a first architecture, further including a second sample implemented by a second processor running a second architecture, wherein the abstract language states used to describe the first sample are the same abstract language states used to describe the second sample.

Example 31 includes an apparatus to classify samples as clean or malicious comprising means for converting the sample into a sequence of instructions, means for transforming the sequence of instructions into an abstract language representation, means for creating a Markov transition matrix, the Markov transition matrix to represent transitions within the abstract language representation, and means for classifying an unknown sample as clean or malicious, the classification in response to whether the Markov transition matrix is closer to a clean group of Markov transition matrices or a malicious group of Markov transition matrices.

Example 32 includes the apparatus of example 31, wherein the clean group of Markov transition matrices is one of a corpus of clear groups and the malicious group of Markov transition matrices if one of a corpus of malicious groups.

Example 33 includes the apparatus of example 31, wherein the means for classifying is further to calculate a first difference value between the Markov transition matrix and the clean group of Markov transition matrices, and a second difference value between the Markov transition matrix and the malicious group of Markov transition matrices.

Example 34 includes the apparatus of example 33, wherein the Markov transition matrix is closer to the clean group of Markov transition matrices if the first difference value is lower than the second difference value.

Example 35 includes the apparatus of example 34, wherein the means for classifying is further to classify the unknown sample as clean if the first difference value meets a first threshold.

Example 36 includes the apparatus of example 33, further including means for adding the unknown sample to the clean group of Markov transition matrices, the addition in response to the first difference value meets a second threshold.

Example 37 includes the apparatus of example 31, wherein the Markov transition matrix is of first order.

Example 38 includes the apparatus of example 31, wherein the Markov transition matrix is of an order higher than one.

Example 39 includes the apparatus of example 31, wherein the sequence of instructions includes operations and operands, wherein to transform the sequence of instructions into an abstract language representation, the means for transforming is to implement a clustering algorithm to group the operations and operands into a sequence of abstract language states.

Example 40 includes the apparatus of example 39, wherein the sample is a first sample implemented by a first processor running a first architecture, further including a second sample implemented by a second processor running a second architecture, wherein the abstract language states used to describe the first sample are the same abstract language states used to describe the second sample.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to classify samples as clean or malicious, the apparatus comprising:
    memory;
    machine readable instructions; and
    processor circuitry to at least one of instantiate or execute the machine readable instructions to:
    disassemble a known portable executable (PE) file that is not malicious into first instructions, the first instructions including first operation codes that are compatible with a first processor architecture;
    transform the first instructions into a first sequence of states within an abstract language representation, the first sequence of states based on one more of the first operation codes;
    create a first Markov transition matrix to represent transitions within the first sequence of states;
    disassemble an unknown PE file into second instructions, the second instructions including second operation codes that are compatible with a second processor architecture but are not compatible with the first processor architecture;
    transform the second instructions into a second sequence of states within the same abstract language representation, the second sequence of states based on one or more of the second operation codes;
    create a second Markov transition matrix to represent transitions within the second sequence of states;
    identify a clean group of Markov transition matrices from a corpus of clean groups, the second Markov transition matrix being more similar to the identified clean group than other clean groups within the corpus of clean groups, the corpus of clean groups to include the first Markov transition matrix;
    identify a malicious group of Markov transition matrices from a corpus of malicious groups, the second Markov transition matrix being more similar to the identified malicious group than other malicious groups within the malicious groups;
    classify the unknown PE file as clean or malicious, the classification in response to whether the second Markov transition matrix is closer to the identified clean group of Markov transition matrices or the identified malicious group of Markov transition matrices; and perform an action responsive to a determination that the classified PE file is malicious.

2. The apparatus of claim 1, wherein the machine readable instructions cause the processor circuitry to calculate:
a first difference value between the second Markov transition matrix and the clean group of Markov transition matrices; and
a second difference value between the second Markov transition matrix and the malicious group of Markov transition matrices.

3. The apparatus of claim 2, wherein the second Markov transition matrix is closer to the clean group of Markov transition matrices if the first difference value is lower than the second difference value.

4. The apparatus of claim 3, wherein the machine readable instructions cause the processor circuitry to classify the unknown PE file as clean if the first difference value meets a first threshold.

5. The apparatus of claim 2, wherein the machine readable instructions cause the processor circuitry to add the unknown PE file to the clean group of Markov transition matrices, the addition in response to the first difference value meeting a second threshold.

6. The apparatus of claim 1, wherein the second Markov transition matrix is a first order matrix.

7. The apparatus of claim 1, wherein the second Markov transition matrix is of an order higher than one.

8. The apparatus of claim 1, wherein;
the instructions cause the processor circuitry to implement a clustering algorithm to group the second operation codes into the second sequence of states within the abstract language representation.

9. At least one non-transitory machine-readable medium comprising machine readable instructions that, when executed, cause at least one processor to at least:
disassemble a known portable executable (PE) file that is not malicious into first instructions, the first instructions including first operation codes that are compatible with a first processor architecture;
transform the first instructions into a first sequence of states within an abstract language representation, the first sequence of states based on one more of the first operation codes;
create a first Markov transition matrix to represent transitions within the first sequence of states;
disassemble an unknown PE file into second instructions, the second instructions including second operation codes that are compatible with a second processor architecture but are not compatible with the first processor architecture;
transform the second instructions into a second sequence of states within the same abstract language representation, the second sequence of states based on one or more of the second operation codes;
create a second Markov transition matrix to represent transitions within the second sequence of states;
identify a clean group of Markov transition matrices from a corpus of clean groups, the second Markov transition matrix being more similar to the identified clean group than other clean groups within the corpus of clean groups, the corpus of clean groups to include the first Markov transition matrix;
identify a malicious group of Markov transition matrices from a corpus of malicious groups, the second Markov transition matrix being more similar to the identified malicious group than other malicious groups within the malicious groups;
classify the unknown PE file as clean or malicious, the classification in response to whether the second Markov transition matrix is closer to the identified clean group of Markov transition matrices or the identified malicious group of Markov transition matrices; and
perform an action responsive to a determination that the classified PE file is malicious.

10. The at least one non-transitory machine-readable medium of claim 9, wherein the instructions, when executed, cause at least one processor to calculate:
a first difference value between the second Markov transition matrix and the clean group of Markov transition matrices; and
a second difference value between the second Markov transition matrix and the malicious group of Markov transition matrices.

11. The at least one non-transitory machine-readable medium of claim 10, wherein the second Markov transition matrix is closer to the clean group of Markov transition matrices if the first difference value is lower than the second difference value.

12. The at least one non-transitory machine-readable medium of claim 11, wherein the instructions, when executed, cause the at least one processor to classify the unknown PE file as clean if the first difference value meets a first threshold.

13. The at least one non-transitory machine-readable medium of claim 10, wherein the instructions, when executed, cause the at least one processor to add the unknown PE file to the clean group of Markov transition matrices, the addition in response to the first difference value meeting a second threshold.

14. The at least one non-transitory machine-readable medium of claim 9, wherein the second Markov transition matrix is a first order matrix.

15. The at least one non-transitory machine-readable medium of claim 9, wherein the second Markov transition matrix is of an order higher than one.

16. A method to classify a portable executable (PE) file as clean or malicious, the method comprising:
disassembling a known portable executable (PE) file that is not malicious into first instructions, the first instructions including first operation codes that are compatible with a first processor architecture;
transforming the first instructions into a first sequence of states within an abstract language representation, the first sequence of states based on one more of the first operation codes;
create a first Markov transition matrix to represent transitions within the first sequence of states;
disassembling an unknown PE file into second instructions, the second instructions including second operation codes that are compatible with a second processor architecture but are not compatible with the first processor architecture;
transforming the second instructions into a second sequence of states within the same abstract language representation, the second sequence of states based on one or more of the second operation codes;
creating a second Markov transition matrix to represent transitions within the second sequence of states;

identifying a clean group of Markov transition matrices from a corpus of clean groups, the second Markov transition matrix being more similar to the identified clean group than other clean groups within the corpus of clean groups, the corpus of clean groups to include the first Markov transition matrix;

identifying a malicious group of Markov transition matrices from a corpus of malicious groups, the second Markov transition matrix being more similar to the identified malicious group than other malicious groups within the malicious groups;

classifying an unknown PE file as clean or malicious, the classification in response to whether the second Markov transition matrix is closer to a clean group of Markov transition matrices or a malicious group of Markov transition matrices; and performing an action responsive to a determination that the classified PE file is malicious.

17. The method of claim 16, further including calculating:
   a first difference value between the second Markov transition matrix and the clean group of Markov transition matrices; and
   a second difference value between the second Markov transition matrix and the malicious group of Markov transition matrices.

18. The method of claim 17, wherein the second Markov transition matrix is closer to the clean group of Markov transition matrices if the first difference value is lower than the second difference value.

19. The method of claim 17, further including classifying the unknown PE file as clean if the first difference value meets a first threshold.

20. The method of claim 17, further including adding the unknown PE file to the clean group of Markov transition matrices, the addition in response to the first difference value meeting a second threshold.

* * * * *